United States Patent [19]
Keller

[11] 3,918,606
[45] Nov. 11, 1975

[54] FUEL TANK FILLER CAP

[76] Inventor: Russell D. Keller, 10360 S.E. Mather Rd., Clackamas, Oreg. 97015

[22] Filed: Mar. 6, 1974

[21] Appl. No.: 448,492

Related U.S. Application Data

[63] Continuation-in-part of Ser. No. 414,116, Nov. 8, 1973, abandoned.

[52] U.S. Cl. .............. 220/208; 137/43; 220/209; 220/303
[51] Int. Cl.² ............... B65D 51/16; B65D 51/18; F16K 17/04
[58] Field of Search .......... 220/202–209, 220/303; 137/43

[56] References Cited
UNITED STATES PATENTS

| | | | |
|---|---|---|---|
| 1,683,338 | 9/1928 | Evinrude | 137/43 |
| 1,893,942 | 1/1933 | Jensen | 137/43 |
| 2,113,454 | 4/1938 | Mitchell | 137/43 |
| 2,376,123 | 5/1945 | Cohen | 137/43 |
| 2,968,421 | 1/1961 | Eshbaugh | 220/303 X |
| 3,021,856 | 2/1962 | Bend et al. | 137/43 |
| 3,083,862 | 4/1963 | Bowden | 220/202 |
| 3,084,704 | 4/1963 | Marx | 137/43 |
| 3,123,087 | 3/1964 | Marx | 137/43 |
| 3,757,987 | 9/1973 | Marshall | 220/204 |
| 3,765,435 | 10/1973 | Schlanzky | 137/43 |

*Primary Examiner*—John Petrakes
*Attorney, Agent, or Firm*—Klarquist, Sparkman, Campbell, Leigh, Hall & Whinston

[57] ABSTRACT

An improved fuel tank filler cap having an air vent with valving means to close the vent and prevent escape of fuel upon tilting of the tank and further means to quickly relieve pressure in the tank in the event of pressure build up as a result of applied heat, as from a fire, and a further venting system to vent any pressure build up resulting from feed back of fuel in a crossover feeding system.

4 Claims, 9 Drawing Figures

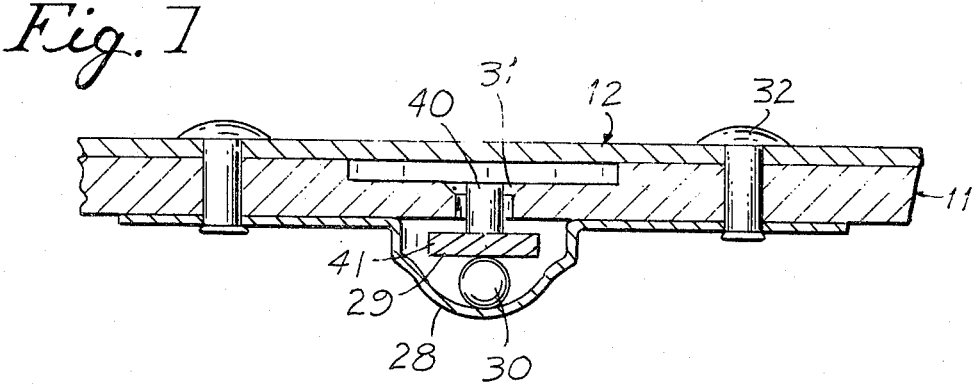
Fig. 7
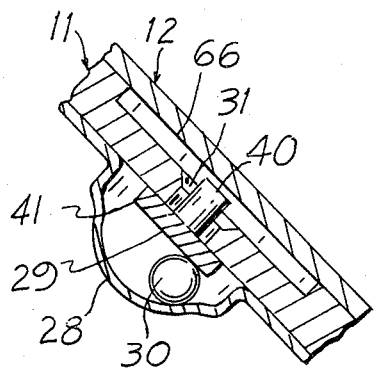
Fig. 8
Fig. 9
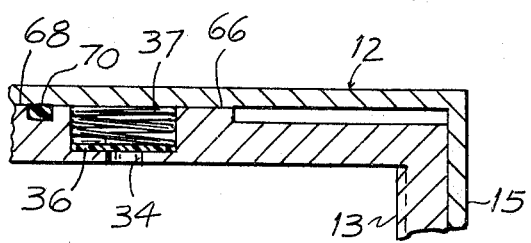

FUEL TANK FILLER CAP

This application is a continuation-in-part of my prior application Ser. No. 414,116, filed Nov. 8, 1973, and now abandoned.

BACKGROUND OF THE INVENTION

Revised Federal safety standards have imposed rigid requirements on the construction of fuel tanks for over-the-road vehicles. For example, a tank must be provided with a safety venting system so that if the internal pressure in the tank exceeds 50 pounds per square inch gauge the venting system will activate to relieve the pressure and prevent any further build up in such pressure. Heretofore, fuel tanks have been provided with a soft plug that will rupture upon attaining such pressure. As a result of such rupture the fuel is permitted to escape and it may continue to escape even though the pressure within the tank may be relieved. This obviously will permit fuel to feed an existing fire and otherwise could create a hazardous condition.

Another requirement is that after filling of a tank to capacity, and with the fuel pipe cap installed, the tank must be able to turn within an angle of 150° in any direction about any axis from its normal position without leaking more than one ounce by weight of fuel per minute.

SUMMARY OF THE INVENTION

In accordance with the present invention the above safety requirements are fulfilled and in addition other advantages are provided.

The invention comprises a cap for a fuel tank filler pipe which includes an air vent which is capable of admitting air to the tank as fuel is normally withdrawn therefrom, but which vent is provided with a sealing means that will seal upon tilting of the tank so as to prevent any escape of fuel through the vent during the rotation of the tank through the 150° angle mentioned above.

The cap is also provided with a spring biased venting valve adapted to release pressure before attainment of the 50-pound maximum pressure permitted so as to vent any gas or liquid fuel sufficient to release the pressure within the tank. However, upon relieving of the pressure the spring will effect reseating of the valve to prevent further escape of fuel or gaseous fumes thereby minimizing the feeding of the fire or the creation of a hazardous condition about the fuel tank.

In addition to the foregoing the tank of the invention is provided with a spring biased relief valve that is adapted to relieve any pressure within the tank when the pressure exceed four or five pounds per square inch, thus to vent the tank in case of cross over operation where fuel is fed back to the tank. This valve is provided as a backup to the normal venting system which may accidentally seal.

DRAWINGS

FIG. 7 is an enlarged, fragmentary, cross-sectional view of the cap showing details of construction of the venting valve;

FIG. 8 is a sectional view of the valve as shown in FIG. 7, showing the operation of the valve in the tilted condition of the tank to which the cap is attached; and FIG. 9 is a fragmentary view showing the assembled pressure relief valve of FIG. 6.

DETAILED DESCRIPTION OF THE INVENTION

Figure 1:
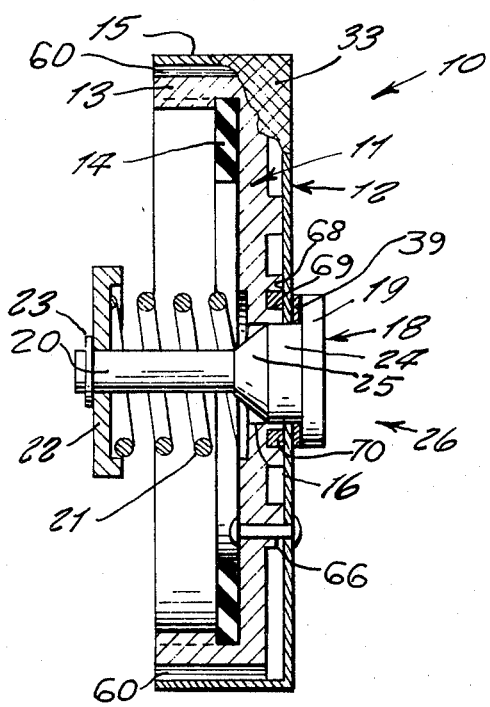
FIG. 1 is a cross-section view of a cap constructed in accordance with the present invention.
Figure 3:
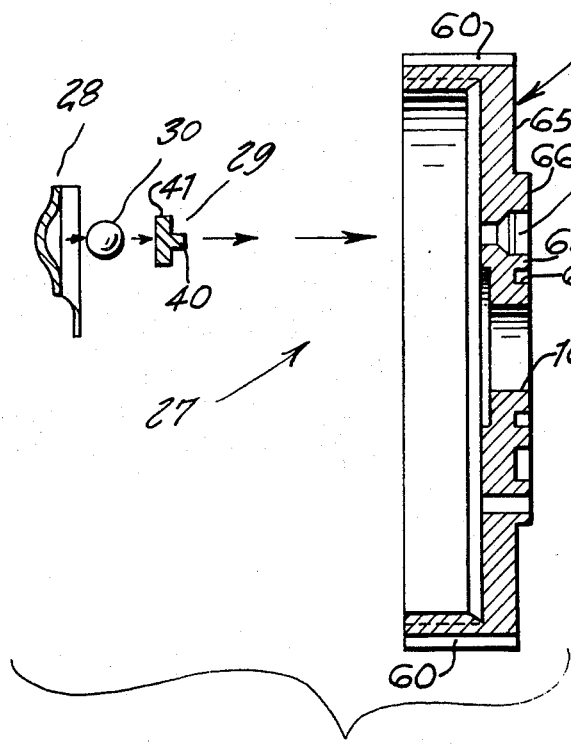
FIG. 3 is a cross-sectional view taken on line 3—3 of FIG. 4.
Figure 4:
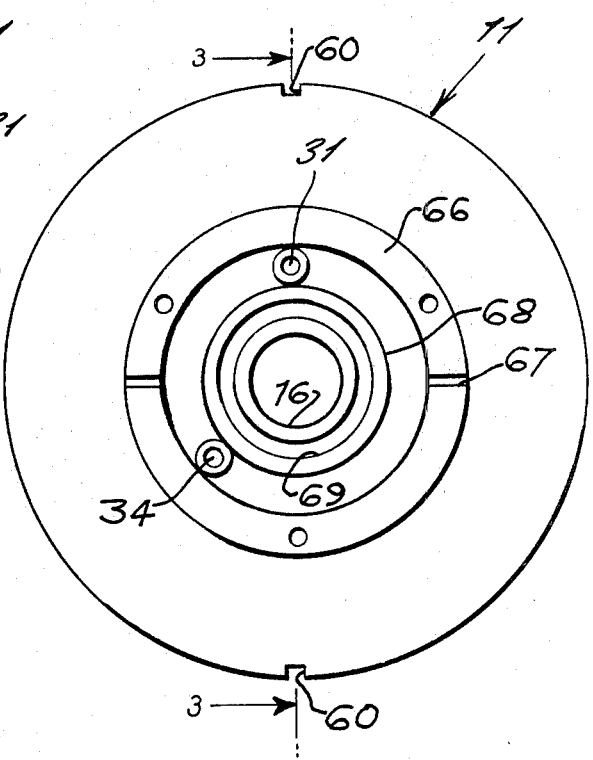
FIG. 4 is a plan view showing the inner shell of the device removed from the assembly.
Figure 5:
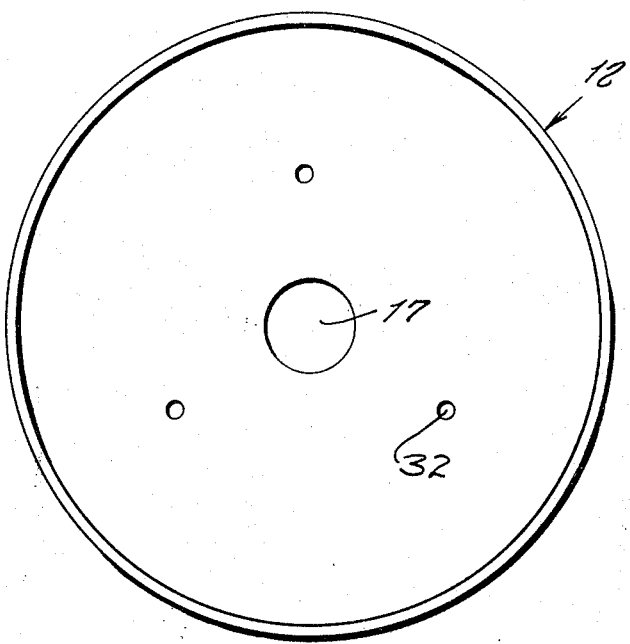
FIG. 5 is a bottom view of the outer cover removed from the assembly.

Referring now to the drawing, the reference numeral 10 represents an improved fuel tank filler cap according to the present invention wherein the same includes a circular inner shell 11 which upon its outer side is fitted with an outer cover 12. The inner shell 11 includes a flat circular central portion having a cylindrically shaped peripheral flange 13 on one side so that the inner shell can be fitted over the top end of a vertical fuel tank filler pipe of a truck or like vehicle. The flange 13 may be provided with threads, indicated by dotted lines in FIGS. 1 and 3, to engage with threads on the filler pipe or any other suitable retaining means may be provided. A ring shaped gasket 14 is fitted into the under side thereof for engaging the end of the filler pipe. The top surface 65 of the inner shell 11 is provided with an outer annular upstanding rib 66 concentric with a centrally disposed opening 16 through the top wall of the shell. The rib 66 has a pair of venting slots 67 formed therethrough. The shell 11 also has an inner upstanding rib 68 immediately surrounding the opening 16, which rib has a circular groove 69 formed therein for receiving an O-ring or similar gasket 70. The tops of the ribs 66, 68 are coplanar. Referring to FIG. 4, two openings 31, 34 located between the ribs 66, 68 extend through the inner shell 11.

The outer cover 12 likewise includes a cylindrically shaped flange 15 on one side that fits closely around the flange 13 of the inner shell, the outer cover 12 serving to prevent the entry of dirt or dust to the venting valves hereinafter described. The flange 13 is provided with a pair of diametrically opposed vent slots 60, the purpose of which will be made clear hereinafter.

Figure 2:
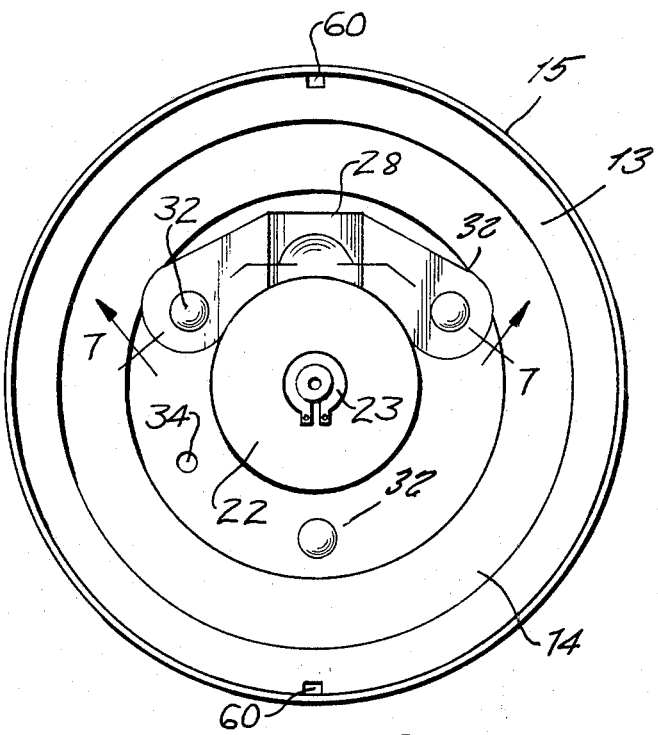
FIG. 2 is a bottom view thereof.

In accordance with current safety regulations the fuel tanks of trucks and similar vehicles are required to have a pressure relieving means which functions to relieve the pressure in a fuel tank when it exceeds fifty pounds per square inch to prevent the tank from exploding and causing the contents to spray. Such pressures may result when the tank is exposed to the heat of a fire resulting from an accident or otherwise. Heretofore, soft plugs have been placed in tanks, but if such are blown under pressure they provide an opening from which the fuel or vapors can continue to escape to feed the fire even after the pressure has been relieved. The cap of the invention is provided with an improved safety relief valve 26 designed to overcome such disadvantages and which will now be described with reference to FIGS. 1 and 2.

A central opening 16 through the inner shell and a central opening 17 through the outer cover are provided for receiving a stem 18 having an enlarged head 19 on one end for resting against the outer side of the outer cover 12, the stem including inwardly extending straight shank 20 around which there is positioned a compression coil spring 21 which at one end bears against the underside of the inner shell, and which at its other end bears against a spring pressure plate 22 that is stationarily supported upon the shank 20 by means of a snap ring 23 fitted therein in an angular groove near the terminal end of the shank 20. Adjacent the enlarged head 19 of the stem 18 there is an enlarged diameter portion 24 that fits closely within the openings 16 and 17, the stem also having a conically tapering portion 25 between the portion 24 and the straight shank 20. An O-ring 39 is fitted around the portion 24 beneath the head 19 to seat against the cover 12 and form a seal to prevent the escape of vapor or fuel from the tank when valve 26 is closed. The spring 21 is selected such that safety relief valve 26 will open when the pressure in a fuel tank upon which the cap 10 is placed attains 50 pounds per square inch. When the pressure has been relieved, the head 19 will reseat. This will stop further escape of liquid fuel or vapors so as not to feed any existing fire. If the pressure again exceeds 50 pounds per square inch, valve 26 will reopen until once again the pressure is relieved. The O-ring 70 prevents escape of fuel or fumes into the space between the shell 11 and cover 12.

The cap 10 includes a venting valve 27 which will permit air to flow into the fuel tank as fuel is withdrawn in normal operation, but which venting valve is adapted to close in the event the cap tilts more than about fifteen degrees from the normal horizontal position of the top plate of the cap, as might occur in the event of an accident, so as to prevent the escape of liquid fuel or vapor through the valve 27. Referring to FIGS. 3, 7 and 8, the valve 27 includes a valve body 29 having a stem 40 and a head 41. The stem 40 slides in an opening 31 through the body of the inner shell 11, the stem and opening having sufficient clearance to permit air to flow into the tank easily in the normal operation of the engine drawing fuel from the tank to avoid forming a vacuum therein. The top portion of the opening 31 is preferably counter bored, as best seen in FIG. 3. Air passes to the opening 31 through a flow path including the slots 60, across the top of the inner shell 11, through the slots 67 and thence to opening 31. Referring to FIG. 7, in the normal position of the cap 10 the body 29 slides downwardly so that the head 41 engages ball 30 which in turn is held loosely within the cup-shaped retainer 28. In this position sufficient clearance is provided between the head 41 and the bottom surface of the inner shell 11 to permit normal flow of air into the tank, see FIG. 7. In the event that the cap 10 is tilted beyond an angle of about fifteen degrees from the horizontal, the ball 30 will roll downwardly in the retainer 28, as shown in FIG. 8, and, because of the convergance of the retainer 28 and the inner shell 11, will force the head 41 of valve body 29 against the inner shell 11 to prevent the escape of fuel through opening 31. The opening 31 will remain sealed at any greater angle or through the 150 degrees required by current Federal regulations.

It is to be noted that the inner shell and the outer cover are permanently secured together by means of a plurality of three rivets 32 spaced equal distances apart around a concentric circle. The outer peripheral edge of the outer cover is provided with a knurl 33 in order that the fuel cap frictionally easily held in order that it may be turned to open or close upon the end of the gas tank filler pipe.

Figure 6:
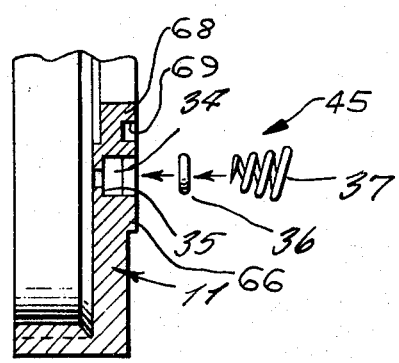
FIG. 6 is an enlarged exploded view of the pressure relief valve for cross over operation.

In two tank fuel systems for Diesel engines, a portion of the fuel pumped from one tank is returned to the other tank. Occasionally, the venting valve 27 will accidentally seal, as, for example, when road vibration causes valve head 41 to bounce into contact with shell 11. A slight pressure within the tank or coating of oil on the head or shell may cause the valve body to seat preventing further venting of the tank and causing pressure to increase as more fuel is returned to the tank. To prevent excessive pressure from developing a further pressure relief valve 45 is provided, which is illustrated in FIGS. 6 and 9. Such valve comprises an opening 34 extending through the inner shell 11 and counterbored to provide a shoulder 35. Seated against shoulder 35 is a circular valve disc 36 of lesser diameter than the counterbore which is urged against the shoulder 35 by a spring 37 extending between the disc and the outer shell 12 as best shown in FIG. 9. The spring 37 should have compressive strength such that a pressure of four or five pounds per square inch will lift the disc 36 to vent the tank. The spring 37 should have sufficient strength, however, to maintain the disc 36 in sealing engagement under the maximum head of fuel in a tipped fuel tank imposed upon the disc, which head will be less than four or five pounds per square inch in the conventionally dimensioned truck tanks.

Thus there is provided an improved fuel tank filler cap that incorporates a safety relief valve and also a safety vent valve, the present cap accordingly having numerous advantages over the conventional fuel caps and at the same time also complying to the Federal requirements of rules and regulations.

I claim:

1. A cap for a vertical filler pipe of the fuel tank of a vehicle comprising:

an inner shell having a flat portion adapted to extend horizontally across the end of a filler pipe and a peripheral flange to surround and engage with the filler pipe;

a first vent passage through said inner shell flat portion for permitting the flow of air into said tank in the normal operation thereof;

first valve means for said first vent passage adapted to seal the same upon tilting of said cap a predetermined amount from its normal position;

said first valve means comprising a valve member having a stem slidably engaged in said vent passage and a head upon its lower end of larger diameter than said vent passage;

a ball positioned beneath said head;

and a ball retainer positioned beneath said ball;

said ball retainer being cup-shaped with a lowermost center portion concentric with said stem and converging in all directions outwardly from said center portion toward the lower surface of said shell flat portion;

the lowermost center portion being spaced beneath said lower surface a distance such that said valve means head, when resting on said ball, is displaced from said lower surface thereby to permit air to flow through said vent passage;

said retainer converging toward said lower surface such that, upon tilting of said cap beyond a predetermined angle in any direction, said ball will force said head into engagement with said lower surface;

a cover surrounding said inner shell;

rib means extending between said cover and the outer surface of said inner shell flat portion to space said cover from said surface and provide an air passage therebetween;

said inner shell flange having grooves in the outer surface thereof communicating with said air passage for permitting air to flow between said air passage and the atmosphere;

a second vent passage through said inner shell flat portion spaced from said first vent passage;

second valve means for said second vent passage adapted to seal the same upon seating therein;

said spring means connected between said inner shell and said second valve means for normally seating said second valve means in said second vent passage and allowing said valve means to unseat upon an increase of pressure in said tank beyond a predetermined amount.

2. A cap as set forth in claim 1 wherein said inner shell and said cover are formed with concentric central openings;

said second vent passage being said central opening in said inner shell;

said second valve means comprising a valve body including a head adapted to seat upon said cover surrounding said central opening therein and, seal means extending between said cover and said inner shell immediately adjacent said central opening to prevent the escape of fuel into said air passage;

and said spring means being operatively arranged with said head to urge the same into engagement with said cover, said spring means having predetermined strength whereby said head is moved away from said cover upon increase of pressure in said tank beyond a predetermined amount.

3. A cap as set forth in claim 1 including a vent valve to vent said tank in cross over operation of the same comprising:

a vent passage through said inner shell flat portion opening into said air passage, said passage being counterbored from the top surface of said inner shell defining a shoulder;

a valve disc in said counterbore adapted to seat against said shoulder;

and compression spring means extending between said valve disc and said cover urging said disc against said seat, said spring having a compressive resistance such that said disc will unseat upon the application of a pressure of about four pounds per square inch to the under surface thereof.

4. A cap as set forth in claim 1 wherein said inner shell and said cover are formed with concentric central openings;

said second vent passage being said central opening in said inner shell;

said second valve means comprising a valve body including a head adapted to seat upon said cover surrounding said central opening therein and a stem extending downwardly through said opening and beneath said inner shell;

seal means extending between said cover and said inner shell immediately adjacent said central opening to prevent the escape of fuel into said air passage; and a pressure plate secured to the lower end of said stem;

said spring means being a compression spring extending between said pressure plate and said inner shell to retain said head in engagement with said cover until a predetermined pressure is attained in said fuel tank.

* * * * *